*J. Weidenman,*

*Rubber Shoe,*

*Nº 71,095.  Patented Nov. 19, 1867.*

Witnesses  
J. Alvin Fraser  
Alex F. Roberts

Inventor:  
J. Weidenman  
Per Munn & Co  
Attorneys

United States Patent Office.

J. WEIDENMAN, OF HARTFORD, CONNECTICUT.

Letters Patent No. 71,095, dated November 19, 1867.

IMPROVED RUBBER SHOES.

*The Schedule referred to in these Letters Patent and making part of the same.*

TO ALL WHOM IT MAY CONCERN:

Be it known that I, J. WEIDENMAN, of Hartford, in the county of Hartford, and State of Connecticut, have invented a new and useful Improvement in Rubber Shoes; and I do hereby declare that the following is a full, clear, and exact description of the same, which will enable others skilled in the art to make and use my invention, reference being had to the accompanying drawings, which form part of this specification, in which—

My invention has for its object to furnish an improved device for attachment to rubber over-shoes, to keep them from slipping down upon or working under the heel of the inner shoe; and it consists of a bar, having a step formed upon its lower end, and the upper end of which is secured to the rear part of the rubber shoe, near its upper edge, and in the combination therewith of arms or cross-bars; the whole being constructed and arranged as hereinafter more fully described.

Figure 1:
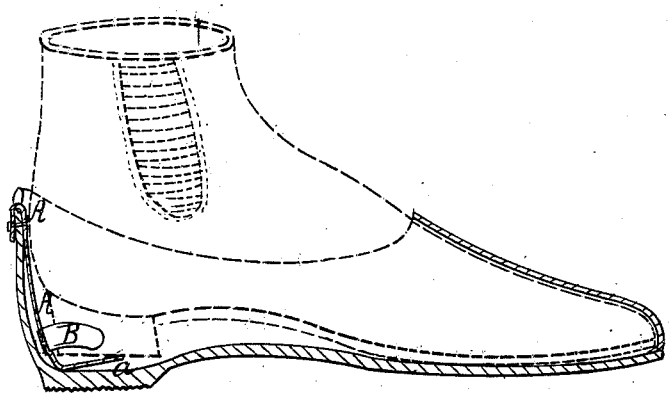
Figure 1 represents a vertical longitudinal section of my device, and of a rubber shoe to which it has been attached.
Figure 2:
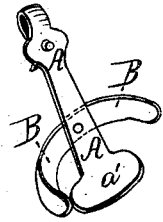
Figure 2 is a perspective view of my improved device.

A represents a bar or spring, the upper end of which is riveted or otherwise securely attached to the upper part of the body of the rubber shoe, above the heel, as shown in fig. 1. The bar A passes down along the inner side of the said rear part, to or nearly to the sole; it is there bent so that its forward end may stand up a little from the sole of the rubber shoe, forming a strap, $a'$. The turned-up lower end of the bar A may be made broader than the rest of the bar, as shown in fig. 2. When a rubber with this device attached is drawn on over an ordinary shoe, the heel of the inner shoe presses upon the step or projecting lower end of the bar A, and forces it down upon the sole of the rubber; this causes the upper end of said bar to incline forward, so as to prevent the outer shoe from being drawn down upon or slipping from the inner shoe in walking. It also serves as a counter to the rubber shoe, preventing it from working down beneath the heel of the inner shoe, as frequently happens. B are arms or short curved bars, which may be made in one or two pieces, and which may be formed upon, or riveted, or otherwise securely attached to the lower part of the bar A, a little above the strap $a'$, in such a position as to embrace the heel of the inner shoe, so as to prevent its slipping about within the rubber shoe. The bar A and arms B may be made elastic or rigid, as may be desired.

Having thus described my invention, I claim as new, and desire to secure by Letters Patent—

1. The bar A, having a strap, $a'$, formed upon its lower end, and attached at its upper end to the rear part of the rubber shoe, substantially as herein shown and described, and for the purpose set forth.

2. The combination of the curved arms B with the bar A, substantially as herein shown and described, and for the purpose set forth.

The above specification of my invention signed by me this fifteenth day of August, 1867.

J. WEIDENMAN.

Witnesses:
W. W. JACOBS,
H. L. PORTER.